Aug. 29, 1939.   D. O. BROWN   2,171,412

GARNISH MOLDING AND SECURING MEANS THEREFOR

Filed July 19, 1937

INVENTOR.
Dewey O. Brown
BY
ATTORNEY

Patented Aug. 29, 1939

2,171,412

UNITED STATES PATENT OFFICE 2,171,412

GARNISH MOLDING AND SECURING MEANS THEREFOR

Dewey O. Brown, Lansing, Mich.

Application July 19, 1937, Serial No. 154,513

3 Claims. (Cl. 296—44)

This invention relates to garnish moldings and more particularly to a means adapted to secure finish moldings in the window openings of doors and paneling of automobile bodies.

The prime object of the present invention is to provide a simple and inexpensive molding for finishing off the window openings in vehicle bodies and particularly in the doors thereof.

A further object is to construct the molding in such a manner that it is readily placed in the window opening of the door and will remain in position without the aid of screws or other external fastening means.

A still further object is to construct such a molding having hidden fastening devices secured thereto which may be readily adjusted or tightened if the molding becomes loose due to vibration of the vehicle and to provide means giving access to the hidden fasteners when it is desired to remove the molding in its entirety.

Present day automobile bodies are constructed with moldings for finishing the interiors of all of the windows and it is customary to form these from a plurality of joined molding strips, or a bent continuous strip of metal joined at its ends or they may be fashioned from a plate and thereafter placed on the interior edge of the window opening of the door or body to give a pleasing and symmetrical finish thereto and to assist in holding the glass in position.

As before mentioned, it has been customary to secure these moldings in the window openings by means of screws passing therethrough and attached to a block in back of the molding or by the use of small bolts placed in openings in the molding and threaded through nuts held in depressions formed in the vehicle door or body frame. These prior structures are attended by several practical difficulties both in initially applying the molding strips and in subsequent servicing, as the screws and nuts become lost and being of small size the parts are easily misplaced or become uncoupled by reason of the vibration of the vehicle. A further objection is that such fastenings have no means of adjustment to take up play which may develop in the molding.

With the present invention, it is possible to prepare the molding either with joined pieces of a continuous length and secure the hidden fastening means therein during the course of the manufacture of the molding so that in assembly the workman has nothing to do other than press the closed figure molding into the opening provided in the door or body structure with assurance that the molding will be properly secured in place.

It will be appreciated by those skilled in the art that the molding and fastening means forming the subject of the present invention is also adaptable for assembling vehicle doors composed of interfitting panels of pressed metal without departing from the spirit of the invention as the same problems of construction and maintenance are present in making up complete vehicle doors as are attendant in providing garnish moldings for window openings.

Referring to the drawing, which discloses by way of example, one form of the invention, it will be seen that it illustrates the garnish molding applied to a window opening of a vehicle door, although as before pointed out the invention is adapted to a much broader application.

Specifically, numeral 1 indicates generally a conventional metal vehicle door having a window opening 2 formed therein and an inwardly extending metal framing 3. Positioned in the top and side walls of the window opening formed in the framing are a plurality of molding securing devices 4 whose construction will be described in detail hereinafter.

Figure 4:
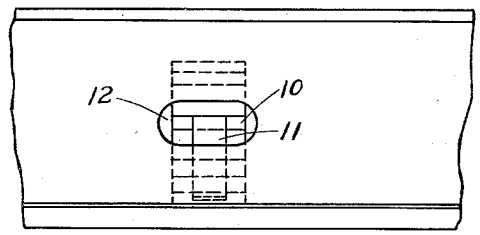
Fig. 4 is a top view of a portion of the door looking downwardly at a portion of the concealed fastening means through an opening in the top edge of the door.
Figure 3:
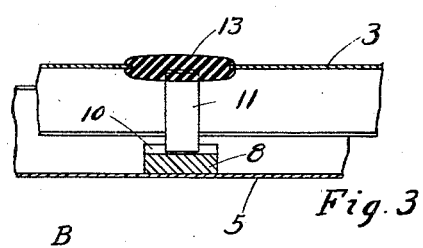
Fig. 3 is an enlarged detailed view taken on line A—A of Fig. 2 in the direction of the arrow.
Figure 2:
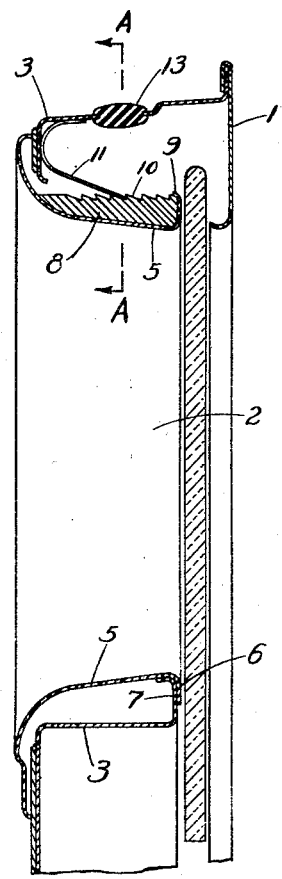
Fig. 2 is an enlarged fragmentary vertical section taken on line B—B of Fig. 1.
Figure 1:
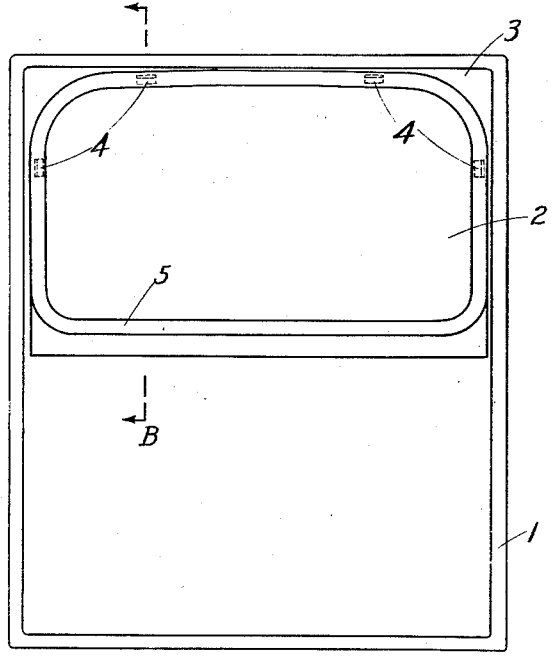
Fig. 1 is a front elevation of a vehicle door showing the interior garnish molding in position and the concealed fastening means in dotted lines.

A continuous or otherwise fabricated, garnish molding or strip 5 is constructed in the form of a closed figure to completely outline the interior of the window opening formed in the framing. As shown in Fig. 2, the lower edge of the molding 5 is down turned at 6 to hook over the edge 7 of the window opening. Each of the concealed fastening means 4 comprise a metal or hard plastic block 8, formed to fit within the outside curvature of the molding and be retained thereagainst by the inturned lip or edge 9 of the molding.

The individual blocks 8 have their upper surfaces notched or corrugated to form a plurality or ratchet teeth 10 with the high portions thereof extending upwardly and sloping portions pointing toward the interior of the vehicle. Cooperating with each of the rack blocks 8 are curved, U-shaped, resilient strips or springs 11 secured by rivets or spot welded to the inside of the framing, as shown in Fig. 2. The free ends of the resilient members 11 are adapted to contact with the teeth 10 of the blocks 8 and by reason of the profile of the teeth, the end of the spring member will ride over the high portions of the teeth and drop into the next succeeding tooth notch when the molding strip is pressed into the window opening.

It will be readily appreciated that the operator in assembling the garnish molding may readily hook the depending edge 6 over the bottom framing and press the entire molding into place and thereby engage the several resilient members or spring strips 11 with their corresponding rack blocks 8 so that by one simple operation the entire molding is firmly affixed in position. If the molding at any future time becomes loose, it is a relatively simple matter to push the molding back in place so the teeth 10 engage with the spring members 11. When it is desired to remove the molding entirely the resilient elements 11 may be readily disengaged from the teeth 10 by inserting a screw driver or other tool through openings 12 formed in the edge of the framing adjacent each fastening means which are normally sealed by plug-like, rubber grommets 13.

What I claim is:

1. In a vehicle body, a door, a window opening therein, a garnish molding for the inner side of said opening, concealed detachable fastening means for securing the said molding in the window opening, said means comprising a plurality of U-shaped springs spaced around the top and sides of the said window opening, said springs being attached at one end to the door structure with the bent portion thereof arranged toward the interior of the vehicle body, cooperating locking blocks carried on the outer side of said garnish molding, ratchet teeth formed on the upper side of said locking blocks, the unattached ends of said U-shaped springs being adapted to ride over and progressively engage the said teeth when the garnish molding is placed in the window opening, and apertures formed in the top and sides of said door adjacent each fastening means permitting access to the said springs whereby they may be disengaged from their respective blocks.

2. The combination comprising a vehicle door having a window opening therein; a garnish molding for one side of said opening; and detachable fastening means for securing the said molding in the window opening, said fastening means including a plurality of spring strips attached by one end to said door in spaced relation around said opening and a plurality of cooperating means on the molding for engaging the free ends of the respective spring strips selectively and retaining the molding in any one of several positions in alignment with said opening; said door being provided with openings in its edges, one adjacent each fastening means, permitting access to said springs, whereby they may be disengaged.

3. The combination comprising a vehicle door having a window opening therein; a garnish molding for one side of said opening; detachable fastening means for securing the said molding in the window opening, said fastening means including a plurality of spring strips attached by one end to said door in spaced relation around said opening and a plurality of cooperating means on the molding for engaging the free ends of the respective spring strips selectively and retaining the molding in any one of several positions in alignment with said opening; said door being provided with openings in its edges, one adjacent each fastening means, permitting access to said springs, whereby they may be disengaged; and removable means for sealing the openings in the door edges.

DEWEY O. BROWN.